Patented Aug. 28, 1945

2,383,734

UNITED STATES PATENT OFFICE 2,383,734

EXPANDED CELL TIGHT RUBBER—AVOIDANCE OF SURFACE STICKINESS

Hans Pfleumer, New Brunswick, N. J., assignor to Rubatex Products, Inc., New York, N. Y. a corporation of Delaware No Drawing. Application March 18 1942,
Serial No. 435,222

4 Claims. (Cl. 260—725)

My invention relates to a method of vulcanizing rubber and more particularly to a method of manufacturing cellular closed cell cell-tight rubber, wherein surface tackiness or stickiness in the finished products is avoided.

Heretobore, in the manufacture of expanded cellular closed cell rubber, hereinafter referred to as "cell-tight rubber," it has been found that the surface of the precured or cured rubber compound during the operation becomes sticky or tacky.

Such processes of manufacture usually include the steps of placing a rubber mix in a mold, admitting nitrogen gas under pressure of the order of 5000 pounds per square inch into the mold and permitting this gas pressure to remain until the rubber mix has absorbed sufficient gas so that the internal pressure of the gas within the rubber, and the external pressure within the mold are substantially equal. At the same time, sufficient heat is applied to effect a partial cure or vulcanization of the rubber so that it acquires a partial set.

When the gas pressure has thus been equalized, the external gas pressure within the mold is removed and therefore the internal gas pressure, the gas within the rubber, causes the same to expand to fill the mold. The internal structure of the rubber is thus cellular in form and the rupture of the internal cells is avoided first by the fact that the rubber has been given a partial set by partial vulcanization and secondly, by the confinement of the mold itself.

When the desired predetermined expansion has occurred, a final vulcanization is then given, and the rubber finally sets in its expanded form, so that the cells are sealed and non-communicating.

These processes are more specifically described in Patents Nos. 2,138,877; 2,140,552 and Re. 21,245.

It has however been observed, both in experiments and in commercial manufacture of cell-tight rubber, that where the rubber is gassed with nitrogen gas under high pressure, and is being vulcanized at the same time, that the surface becomes sticky. This occurs in spite of the fact that the oxygen which would ordinarily cause such stickiness or tackiness is removed as far as possible by employing the purest available form of nitrogen and by evacuating the air from the chamber, and thus removing as much of the oxygen content of the atmosphere as possible.

In the manufacture of cell-tight rubber, the hardness or softness of the finished rubber product depends on the quantity of sulphur which is admixed in the rubber mix which is to be cured. The lower the sulphur content, the softer the rubber.

The stickiness or tackiness which is produced is more pronounced with compounds intended for soft vulcanized closed-cell rubber and which accordingly have a smaller percentage of sulphur. This stickiness or tackiness is due to a lack of vulcanization at the surface of the closed cell rubber.

One theory of this phenomenon may be the following:

Ordinarily, in the vulcanization of rubber the amorphous sulphur, a molecule of the magnitude of $S_8$, is by heat dissociated to $S_2$ molecules in order to combine it with rubber. Accelerators acting as catalysts are employed to hasten this dissociation. Under atmospheric pressure, or slightly above atmospheric pressure, this dissociation by means of heat would proceed normally, so to speak. However, under extremly high pressure, this process of dissociation is considerably hindered. Only additional heat, or, as an alternative, additional sulphur, especially at the surface, could make up for it. There is also a possibility that as the dissociation of sulphur occurs the $S_2$ molecules are with the $N_2$ gas forced into the rubber away from the surface.

At the present time, the only control that is exercised as a preventive of stickiness of the surfaces is a method whereby the rubber is covered either by wrapping in paper or canvas or with aluminum or tin sheets or the like.

In either case, and whatever the reason for the lack of vulcanization at the surface, it is obviously caused by the fact that the sulphur is driven away from the surface during the gassing operation, thus causing a sticky or tacky condition at the surface.

An object of my invention is the provision of a method which will eliminate stickiness or tackiness at the surface of a finished closed cell expanded rubber sheet.

Another object of my invention is the provision of a method which will insure complete vulcanization of the closed cell expanded rubber sheet throughout.

These and other objects of my invention will become apparent in the following description:

In the following, although I refer specifically to rubber, it should be understood that my invention covers other similar materials, including synthetic rubber, plastics of various types, such as Bakelite, and all materials which may in any way be expanded by gas impregnation or internal gas generation, and which may be vulcanized or heat set.

I have found that if before placing the rubber in its unvulcanized state in the mold, I cover or dust the surfaces of the rubber with precipitated sulphur that excellent results are produced.

The particular quantity of sulphur thus to be dusted over the surfaces is not critical, but certain general limits must be observed.

When soft "Rubatex" (closed cell gas expanded rubber) is to be manufactured, then the coating dusted on the surface of the "Rubatex" may be very fine and spread very thinly. When hard "Rubatex" is to be manufactured, the coating may be thicker.

In actual operation, it is sufficient merely to dust the precipitated sulphur onto the surface in rather a thin powdery film, and then place the rubber in its wrapping of paper, canvas or other material preparatory to placing the same in the mold.

At the same time, a lubricant may be provided to permit the rubber properly to expand within the mold, that is, to permit the surface of the rubber to move with respect to the mold during expansion. Hence, the mixture dusted upon the surfaces of the rubber to be gas cured, may consist of precipitated sulphur and soapstone, and/or mica powder added thereto.

In the latter case where such a mixture is used, I prefer that the precipitated sulphur constitute approximately 2% to 5% of the mixture.

I have also found that adding antimony pentasulphide to the mixture will further ensure full vulcanization of the surface.

The type of mixture wherein soapstone or mica powder is added to the coating or dusting, may also be employed in cures when rubber must be wrapped against expansion.

By dusting the wrapping paper or canvas on the inside, before it is placed around the inside, any sticking of rubber to the canvas is positively prevented.

When the rubber to be expanded in the mold has been coated in the manner above pointed out, then as the temperature within the mold is raised to vulcanizing temperatures and the pressure of the gas increases, the sulphur on the surface of the rubber is vaporized, thus tending to prevent escape of sulphur vapor from the surface of the rubber or tending to replace any sulphur vapor which may have escaped therefrom.

Essentially, if the process by which stickiness occurs is to be regarded as due to evaporation of sulphur vapor adjacent to the surface, then the vaporized sulphur formed from the dusted sulphur on the surface forms a blanket of sulphur vapor. That is, the area immediately adjacent the surface is saturated by sulphur vapor and hence any additional sulphur vapor may not be evaporated into this area, so that all of the sulphur vapor remains within the rubber, and the surface does not become sticky. Thus, the blanket of sulphur vapor by preventing escape of sulphur from within the rubber makes the vulcanization process efficient and complete.

If the operation by which the sulphur vapor is moved away from the surface of the rubber is to be regarded as one which is due to the initial pressure differentail between the gas on the outside of the rubber and in the interior of the rubber before the rubber has been fully impregnated, then the sulphur vapor may perhaps be driven away from the surface into the interior of the rubber.

In such case, the provision of a sulphur vapor blanket on the surface of the rubber provides for additional vapor which may be forced into the surface of the rubber to replenish any sulphur vapor which may have been forced into the interior.

I consider it more likely that the cause of the removal of sulphur from the surface of the rubber during vulcanization is the evaporation of the sulphur vapor from the surface thereof, in which case the sulphur vapor blanket created by the sulphur dusted or coated onto the surface prevents such evaporation since it surrounds the surfaces with a blanket of saturated sulphur vapor atmosphere which will not permit further evaporation.

In either case, whether the initial cause for the removal of sulphur from the surface of the rubber being vulcanized under pressure is due to evaporation or to its being driven inwardly by the initial gas pressure differential, the sulphur vapor blanket on the surfaces of the rubber serves either to prevent such evaporation or to replenish such sulphur as may have been driven inwardly.

Whatever theory may be assigned to this operation, I nevertheless have found that where no such sulphur coating or dusting was applied to the external surfaces of the rubber being vulcanized under pressure, the surfaces tended to become sticky or tacky, and where such a sulphur coating was applied to the surfaces then the stickiness or tackiness was obviated and the rubber was vulcanized throughout.

The avoidance of such stickiness or tackiness in expanded closed cell rubber is important. In closed cell expanded cellular rubber, the outer surface forms a skin which is not cellular. This skin may be of the order of a sixty-fourth or a thirty-second of an inch in depth, and provides a finished appearance for the closed cell expanded rubber. The remainder of the entire interior of the rubber thus produced consists of a multiplicity of minute cells not communicating with each other.

Cutting away the skin, would cut through the cells, and while it would not destroy the imperviousness of the expanded rubber, would expose a surface which was made up of a multiplicity of cavities caused by the cutting through of the cells. Thus the outer skin or surface on the closed cell expanded rubber produces a more slightly and finished appearance. It is therefore extremely desirable that this process be complete, and that this outer skin should not be tacky or sticky but rather that it be fully vulcanized.

By the process herein described, I have illustrated one method for avoiding the tackiness or stickiness hereinbefore mentioned.

Many variations and modifications of my processes may now be obvious to those skilled in the art. Accordingly, I prefer to be bound not by the specific disclosures herein, but only by the appended claims.

I claim:

1. In the process of manufacturing cell-tight expanded cellular rubber, the steps of preparing a rubber mix containing sulphur sufficient for vulcanization, coating the surface of the rubber with a mixture of antimony pentasulphide and precipitated sulphur, subjecting the rubber to heat sufficient to at least partially vulcanize the same, and at the same time subjecting the rubber mix to an externally applied impregnating gas under high pressure.

2. In the process of manufacturing cell-tight expanded cellular rubber, the steps of preparing a rubber mix containing sulphur sufficient for vulcanization, coating the surface of the rubber with a mixture of sulphur and an inert lubricant, subjecting the rubber to heat sufficient to at least partially vulcanize the same, and at the same time subjecting the rubber mix to an externally applied impregnating gas under high pressure.

3. In the process of manufacturing cell-tight expanded cellular rubber, the steps of preparing a rubber mix containing sulphur sufficient for vulcanization, coating the surface of the rubber with a mixture of sulphur and mica powder, subjecting the rubber to heat sufficient to at least partially vulcanize the same and at the same time subjecting the rubber mix to an externally applied impregnating gas under high pressure.

4. In the process of manufacturing cell-tight expanded cellular rubber, the steps of preparing a rubber mix containing sulphur sufficient for vulcanization, coating the surface of the rubber with a mixture of sulphur and powdered soapstone, subjecting the rubber to heat sufficient to at least partially vulcanize the same, and at the same time subjecting the rubber mix to an externally applied impregnating gas under high pressure.

HANS PFLEUMER.